US012017382B2

(12) United States Patent
Soler Balcells

(10) Patent No.: US 12,017,382 B2
(45) Date of Patent: Jun. 25, 2024

(54) MANUAL CERAMIC CUTTER WITH ADJUSTABLE SET-SQUARE

(71) Applicant: GERMANS BOADA, S.A., Rubi (ES)

(72) Inventor: Jordi Soler Balcells, Rubi (ES)

(73) Assignee: GERMANS BOADA, S.A., Rubi (ES)

( * ) Notice: Subject to any disclaimer, the term of this patent is extended or adjusted under 35 U.S.C. 154(b) by 409 days.

(21) Appl. No.: 17/562,813

(22) Filed: Dec. 27, 2021

(65) Prior Publication Data

US 2022/0118651 A1 Apr. 21, 2022

Related U.S. Application Data

(63) Continuation of application No. PCT/ES2020/070265, filed on Apr. 27, 2020.

(51) Int. Cl.
*B28D 7/04* (2006.01)
*B28D 1/22* (2006.01)

(52) U.S. Cl.
CPC *B28D 7/04* (2013.01); *B28D 1/22* (2013.01)

(58) Field of Classification Search
CPC .......... B28D 1/22; B28D 1/222; B28D 1/223; B28D 1/225; B28D 1/226; B28D 7/043; B28D 7/04
USPC ........................................................ 125/23.01
See application file for complete search history.

(56) References Cited

U.S. PATENT DOCUMENTS 5,000,237 A * 3/1991 Berkeley ................ B23Q 3/002 144/251.2
5,169,045 A * 12/1992 Liu ........................ B28D 1/225 83/886
5,249,495 A * 10/1993 Renk ........................ B26D 7/00 83/607
6,164,272 A * 12/2000 Fouy ...................... B28D 1/225 125/35
10,059,023 B2 * 8/2018 Baro Cabrero ........ B28D 1/225
2004/0231485 A1 * 11/2004 Eckstein ................ B28D 1/225 83/886
2009/0145416 A1 * 6/2009 Harding ................. B28D 1/225 125/23.02
2010/0269812 A1 * 10/2010 Torrents I Comas .. B28D 7/043 125/23.01

* cited by examiner

*Primary Examiner* — Eric J Rosen
*Assistant Examiner* — Robert C Moore
(74) *Attorney, Agent, or Firm* — Hodgson Russ LLP

(57) ABSTRACT

A manual ceramic cutter with an adjustable set-square, having a set-square (1) installed at one of the longitudinal extremities of a base (2) for supporting the ceramic items to be cut, and a manually-operated cutting head (3) installed with the possibility of displacement along a number of longitudinal guides (4). This cutter comprises adjustment means (13, 14) of the perpendicularity of the set-square (1) with regard to a cutting line (L1) of the cutter, and fixing means (11, 12) of the set-square (1) to the base (2). It further comprises visual verification means of the perpendicularity of the set-square (1) with regard to the cutting line (L1).

4 Claims, 4 Drawing Sheets

MANUAL CERAMIC CUTTER WITH ADJUSTABLE SET-SQUARE

CROSS-REFERENCE

This application is a continuation of International Application No. PCT/ES2020/070265, filed on Apr. 27, 2020, the entire disclosure of which is incorporated herein by reference.

FIELD

This invention is applicable in the sector dedicated to the manufacture of manual tools and more specifically of manual ceramic cutters.

BACKGROUND

Currently, manual ceramic cutters are known comprising: a base for supporting the ceramic items to be cut, a manually-operated cutting head installed with the possibility of displacement along a number of longitudinal guides fixed above the base, and a set-square installed at one of the longitudinal extremities of the base and that forms a lateral supporting stop for the ceramic item to be cut.

In this type of machine, it is necessary for the mentioned set-square to be held perpendicular to the cutting line defined by the cutting head, on the ceramic item, during the displacement of said head along the longitudinal guides.

The misalignment of said set-square with respect to the perpendicular to the cutting line can be caused by different causes, for example by imperfections in the machining of the items during the manufacture thereof, or by the deformation of the set-square with respect to the fixing points of the same to the base due to accidental impacts.

In any case, the deviation of the set-square with respect to the perpendicular of the cutting line constitutes a problem, especially in larger cutters, since a small angular deviation can cause the extremity of the item furthest from the set-square to accumulate an error of several millimetres in the cut, and the rendering of a large-format part unusable and discarded, with the consequent costs derived from both the loss of operator time and the discarded part.

Currently cutters are known that have complex, fragile and not very intuitive systems for adapting the position of the set-square with respect to the base, which causes errors in the calibration of the cutter, damage to the parts and a long adjustment time.

An additional problem is that the operator cannot visually verify whether the set-square is perpendicular to the cutting line, prior to using the cutter, the cutting errors mentioned above being frequent.

Therefore, the technical problem that arises is the development of a manual ceramic cutter that exhibits technical features that enable the aforementioned problems to be solved and, in particular, that enable the position of the set-square with respect to the base to be fitted in a fast, reliable and simple manner, and the perpendicularity to be verified with the naked eye.

SUMMARY

The manual ceramic cutter with adjustable set-square, object of this invention, is of the type comprising: a set-square installed at one of the longitudinal extremities of the supporting base of the ceramic items to be cut, and a manually-operated cutting head installed with the possibility of displacement along a number of longitudinal guides; said cutter exhibiting technical features that enable the aforementioned problems to be solved, having for this purpose suitable means for adapting the position of the set-square with respect to the base in a fast, reliable and simple manner, and to carry out the fixation thereof once it has been conveniently arranged.

For this, and in accordance with the invention, this manual cutter with adjustable set-square comprises adjustment means of the perpendicularity of the set-square with respect to the longitudinal cutting line of the cutter, and fixing means of the set-square to the base, once the position of said set-square with respect to the base has been conveniently adjusted.

Therefore, these adjustment and fixing means of the set-square, make it possible to correct any misalignment of the set-square, caused by a manufacturing error in the items or for any other reason, and prevent the faulty cutting of ceramic items.

According to the invention, the cutter comprises a lateral rotation axis of the set-square with respect to the base, and the fixing means of the set-square comprise at least one fixing screw installed on the base of the cutter through an elongated hole defined in the set-square, and suitable for adjusting the perpendicularity of the set-square with respect to the cutting line of the cutter, by means of a lateral rotation of said set-square, on said rotation axis, towards one side or the other of the base, prior to tightening said fixing screw.

It has been envisaged that the mentioned lateral rotation of the set-square for the positional adjustment thereof, is carried out on the mentioned rotation axis; the set-square can incorporate at least two elongated holes with the respective tightening screws for adjusting the position thereof and arranging it perpendicularly to the cutting line of the cutter.

To control the movements of the set-square during the correct positioning thereof with respect to the base, and to enable a fine tuning of the position thereof, the adjustment means comprise: an elastic element that acts on the set-square and tends to rotate it towards one of the sides of the base, and a manual adaptation screw suitable for rotating the set-square in a controlled manner in the opposite direction to the action of the elastic element.

An additional feature of the invention is that the cutter comprises visual verification means of the perpendicularity of the set-square with respect to the cutting line, which allows the user to visually determine, without using any additional utensil or tool, whether the set-square is arranged perpendicularly to the cutting line, or if it is necessary to adjust the position of the set-square to arrange it perpendicularly to said cutting line, preventing faulty cutting of ceramic items.

According to the invention, said visual verification means of the perpendicularity of the set-square comprise: a longitudinal mark defined at the base of the cutter and parallel to the cutting line, and a viewer fixed to the set-square and arranged aligned with said longitudinal mark of the base when the set-square is arranged perpendicular to the cutting line.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
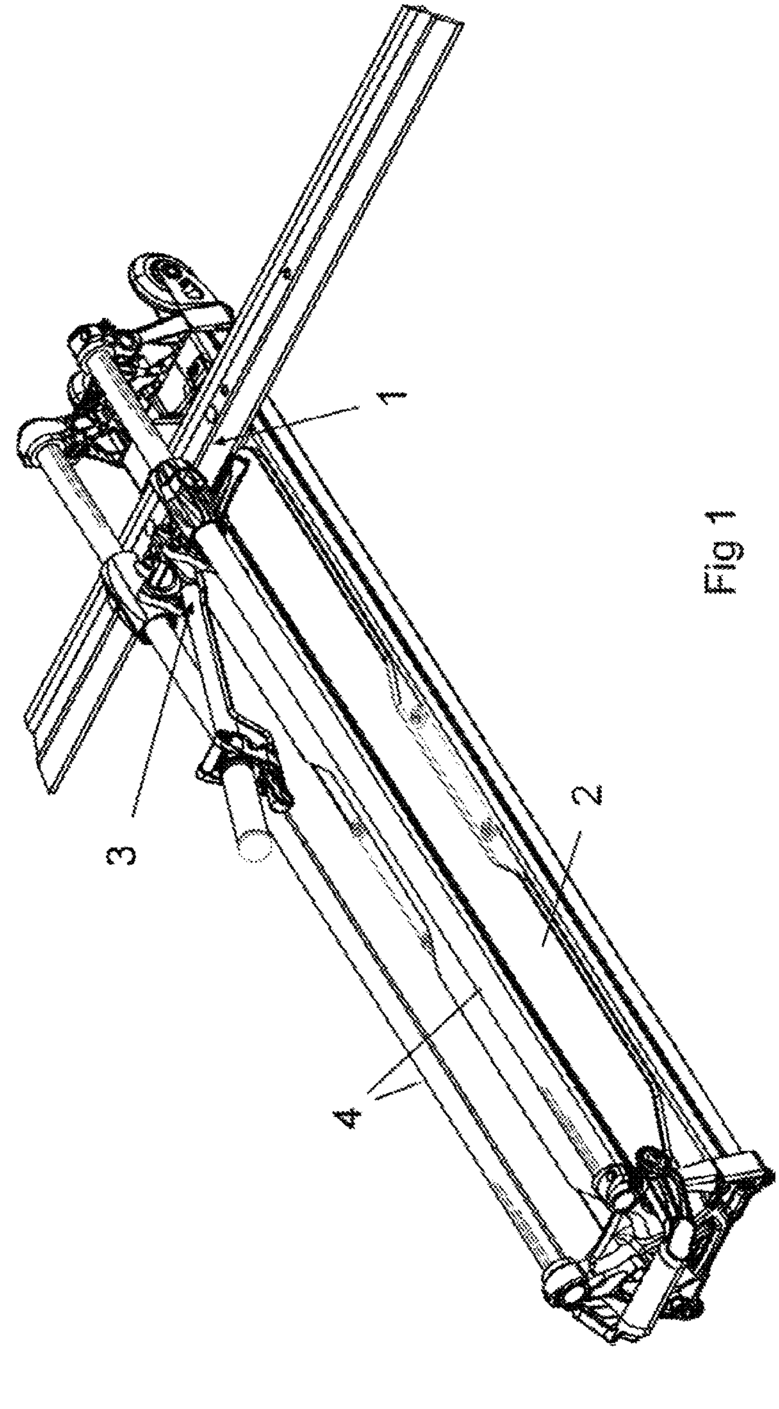
FIG. 1 shows a perspective view of a manual ceramic cutter with adjustable set-square, according to the invention.

As shown in FIG. 1, the manual ceramic cutter with adjustable set-square comprises: an adjustable set-square (1) installed at one of the longitudinal extremities of the base (2) for supporting the ceramic items to be cut, and a manually-operated cutting head (3), installed with the possibility of displacement along a number of longitudinal guides (4) fixed to the base (2) and vertically spaced above the same.

By displacing the cutting head (3) along the guides (3) a longitudinal cutting line (L1) is defined, on the ceramic item (not shown) placed on the base (2) and laterally supported against a support line (L2) defined by the front extremity of the set-square (1).

The cutter comprises a rotation axis (5) of the set-square (1) in a lateral direction with respect to the base (2), for adjusting the perpendicularity thereof with respect to the cutting line (L1).

This rotation axis (5) is very close to the intersection of the cutting line (L1) of the cutter and the supporting line (L2) of the ceramic item against the set-square (1).

Figure 2:
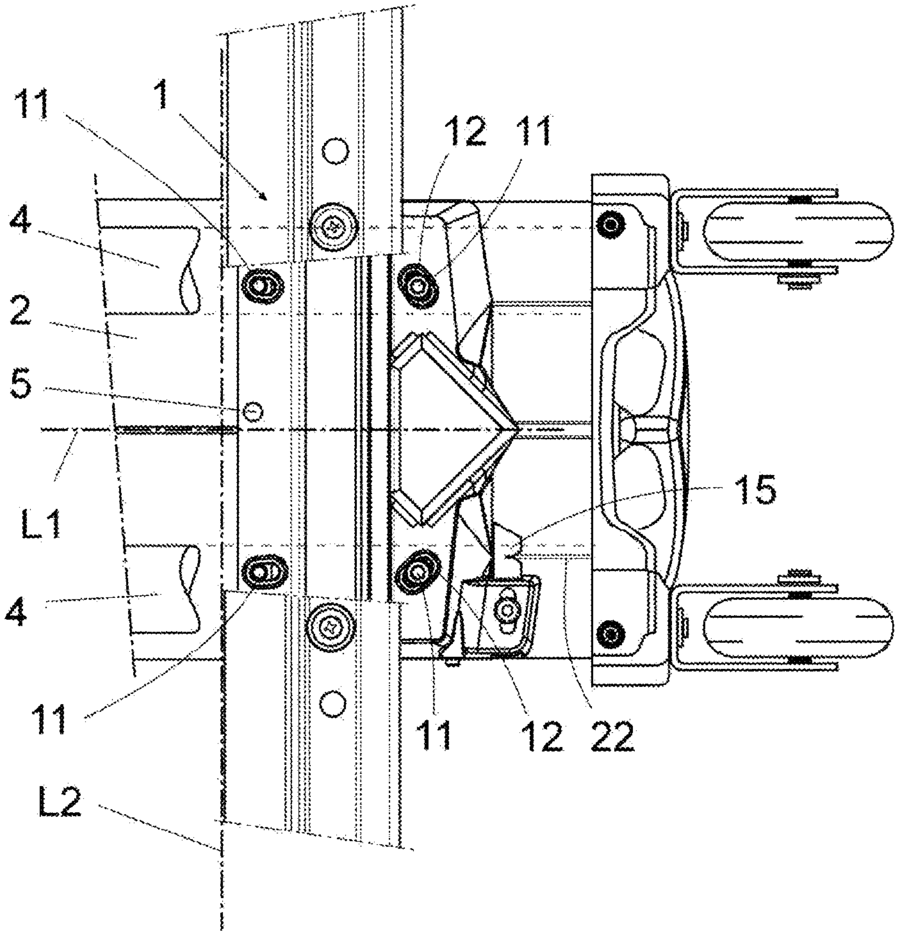
FIG. 2 shows a plan view of a portion of the cutter of the previous figure, with the set-square and the longitudinal guides partially cross-sectioned to enable the fixing means of the set-square to the base and the visual verification means of the perpendicularity of the set-square with respect to the cutting line to be observed.

FIG. 2 shows the fixing means of the set-square (1) to the base (2) of the cutter, made up of fixing screws (11) installed on the base (2) of the cutter, through some elongated holes (12) defined in the set-square (1).

In the example shown, the set-square (1) comprises four elongated holes (12) conveniently oriented to allow a certain lateral rotation of the set-square (1) with respect to the rotation axis (5), and arrange it perpendicularly to the cutting line (L1) of the cutter, before tightening the screws (11) and the immobilisation thereof with respect to the base (2).

Figure 3:
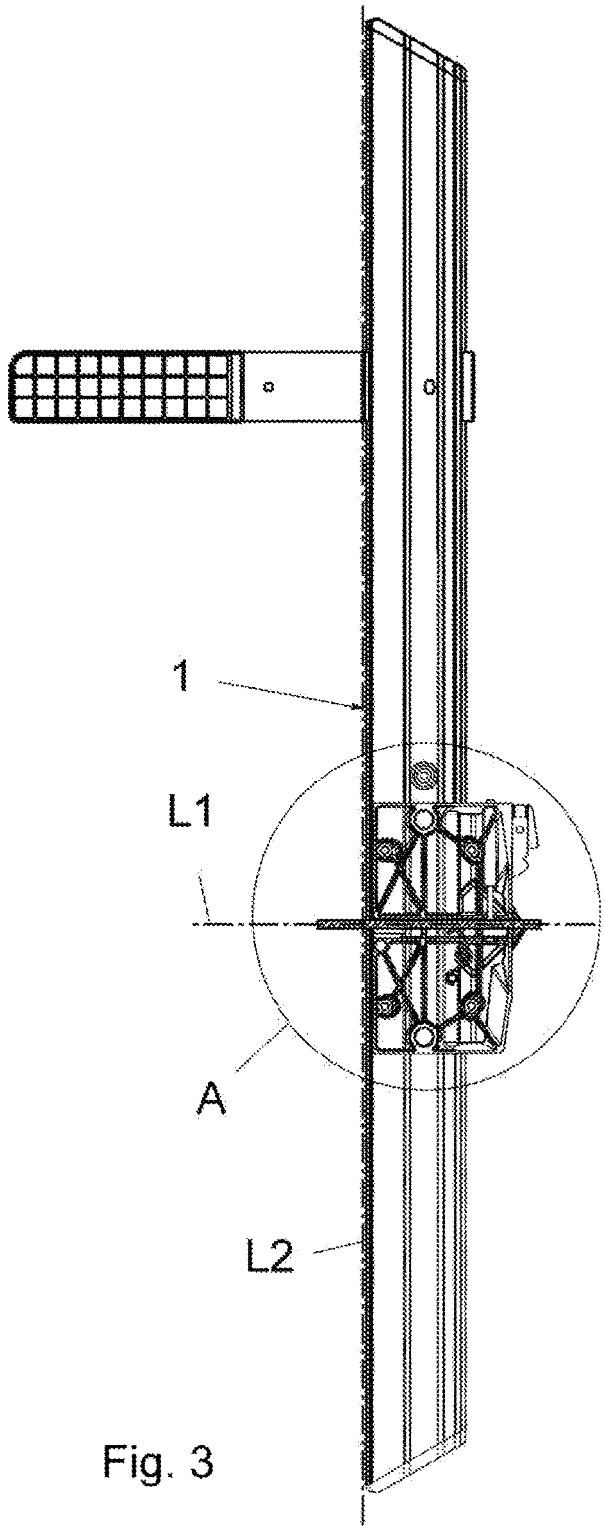
FIG. 3 shows a lower plan detail view of the set-square in which the adjustment means of the position of the set-square with respect to the base, and the fixing means of said set-square to the base, once adjusted, can be observed.
Figure 4:
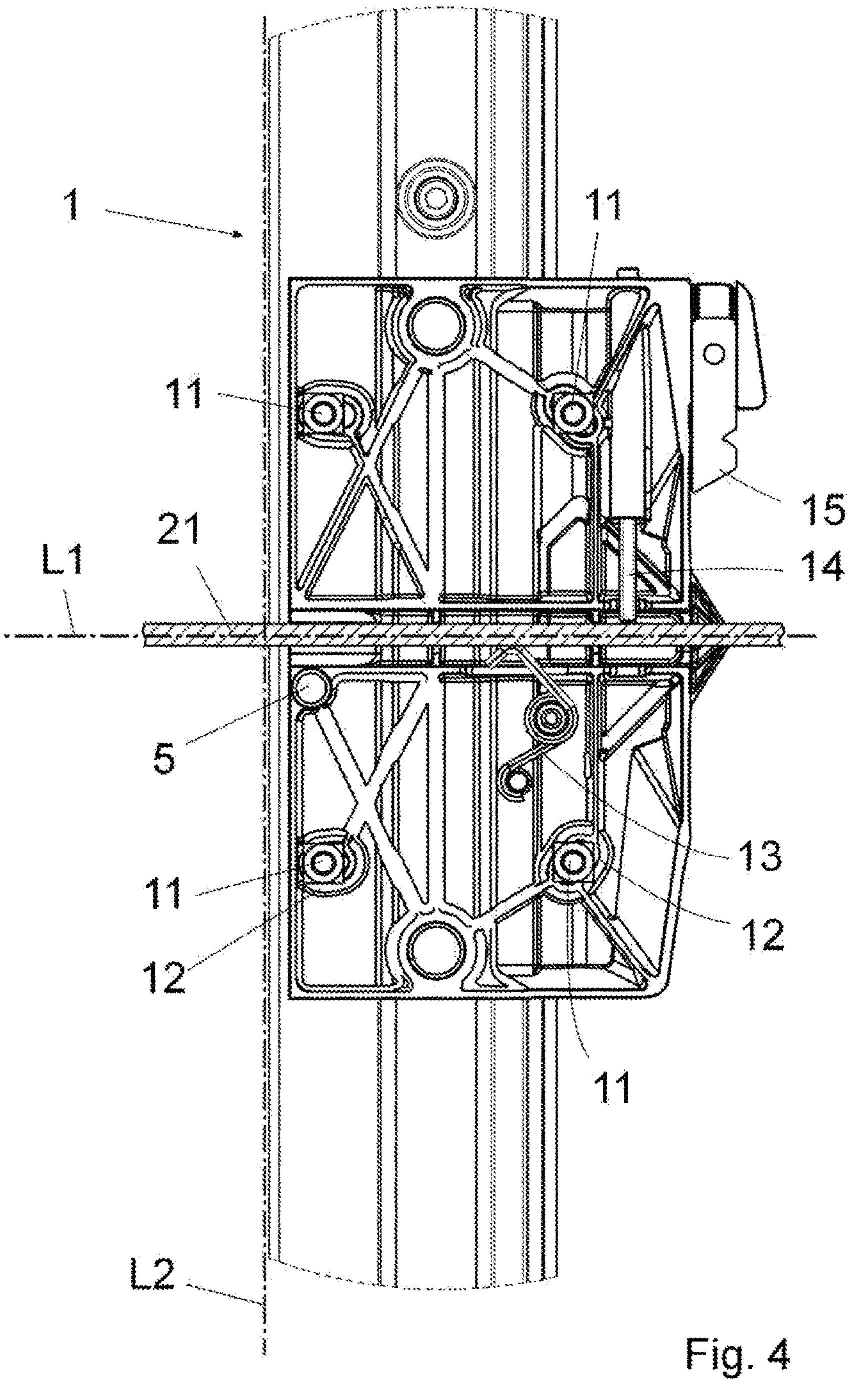
FIG. 4 corresponds to an enlarged view of detail A of FIG. 3.

As can be seen in FIG. 4, corresponding to the enlarged detail (A) of FIG. 3, to correctly position the set-square (1) with respect to the base, the cutter comprises adjustment means of the perpendicularity of the set-square with respect to the cutting line (L1), represented by an elastic element (13) and by a manual fitting screw (14) suitable for rotating the set-square (1) in a controlled manner towards one side or the other of the base (2) and arranging it perpendicularly to the cutting line (L1), referenced in FIG. 2, before tightening the fixing screws (11).

In this embodiment, the manual fitting screw (14) and the elastic element (13) are installed on the set-square (1) and act against a rib (21) defined in the base (1), which can be seen in FIG. 2 and the cross-section of which has been included in FIG. 4, and which coincides with the cutting line (L1) of the cutter.

FIG. 2 also shows the visual verification means of the perpendicularity of the set-square (1) with respect to the cutting line (L1), made up of a longitudinal mark (22), consisting of a groove defined in the base (2) of the cutter and parallel to the cutting line (L1), and of a viewer (15) fixed to the set-square (1) and that is arranged aligned with said longitudinal mark (22) when the set-square (1) is located perpendicularly to the cutting line (L1).

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A manual ceramic cutter, comprising:

a set-square installed on a longitudinal extremity of a base configured to support ceramic items to be cut, and defining a lateral supporting line for the ceramic item to be cut;

a manually-operated cutting head displaceable along a number of longitudinal guides;

an adjustment device configured to adjust perpendicularity of the set-square with respect to a cutting line of the cutter; and a fixing device configured to fix the set-square to the base;

wherein the adjustment device comprises an elastic element that acts on the set-square to rotate it on the set-square on a rotation axis towards a side of the base, and a manual adaptation screw configured to rotate the set-square on the rotation axis in an opposite direction to the action of the elastic element;

wherein the rotation axis is a lateral rotation axis of the set-square with respect to the base.

2. The manual ceramic cutter, according to claim 1, wherein the fixing device of the set-square comprises at least one fixing screw installed on the base of the cutter through an elongated hole defined in the set-square and configured to provide lateral rotation of the set-square with respect to the rotation axis prior to tightening the at least one fixing screw.

3. The manual ceramic cutter according to claim 1, further comprising a visual verification device configured to indicate perpendicularity of the set-square with respect to the cutting line, the visual verification device comprising:

a longitudinal mark defined at the base of the cutter and parallel to the cutting line;

a viewer fixed to the set-square, and aligned with the longitudinal mark of the base when the set-square is arranged perpendicular to the cutting line.

4. The manual ceramic cutter according to claim 2, further comprising a visual verification device configured to indicate perpendicularity of the set-square with respect to the cutting line, the visual verification device comprising:

a longitudinal mark defined at the base of the cutter and parallel to the cutting line;

a viewer fixed to the set-square, and aligned with the longitudinal mark of the base when the set-square is arranged perpendicular to the cutting line.

* * * * *